(12) United States Patent
Matsui et al.

(10) Patent No.: US 9,031,359 B2
(45) Date of Patent: May 12, 2015

(54) DELAY LINE INTERFEROMETER MULTIPLEXER

(75) Inventors: Yasuhiro Matsui, Milpitas, CA (US);
Bernd Huebner, Mountain View, CA (US); Charles B. Roxlo, Saratoga, CA (US)

(73) Assignee: Finisar Corporation, Sunnyvale, CA (US)

( * ) Notice: Subject to any disclaimer, the term of this patent is extended or adjusted under 35 U.S.C. 154(b) by 570 days.

(21) Appl. No.: 13/463,565

(22) Filed: May 3, 2012

(65) Prior Publication Data

US 2012/0281234 A1 Nov. 8, 2012

Related U.S. Application Data

(60) Provisional application No. 61/482,118, filed on May 3, 2011.

(51) Int. Cl.
*G02F 1/01* (2006.01)
*G02F 1/035* (2006.01)
*G02B 6/293* (2006.01)
*H04J 14/02* (2006.01)

(52) U.S. Cl.
CPC ............. *G02B 6/29355* (2013.01); *H04J 14/02* (2013.01)

(58) Field of Classification Search
USPC ......................................................... 385/1, 3
See application file for complete search history.

(56) References Cited

U.S. PATENT DOCUMENTS

| 6,684,002 | B2 * | 1/2004 | Xie et al. .......................... 385/15 |
| 7,046,374 | B1 * | 5/2006 | Barbarossa .................... 356/519 |

* cited by examiner

*Primary Examiner* — Ryan Lepisto
*Assistant Examiner* — Erin Chiem
(74) *Attorney, Agent, or Firm* — Maschoff Brennan (57) ABSTRACT

In an embodiment, a delay line interferometer (DLI) multiplexer (MUX) includes a first stage and a second stage. The first stage includes a first DLI and a second DLI. The first DLI includes a first left input, a first right input, and a first output and has a free spectral range (FSR) that is about four times a nominal channel spacing. The second DLI includes a second left input, a second right input, and a second output and has an FSR that is about four times the nominal channel spacing. The second stage is coupled to the first stage and includes a third DLI. The third DLI includes a third left input optically coupled to the first output, a third right input optically coupled to the second output, and a third output. An FSR of the third DLI is about two times the nominal channel spacing.

21 Claims, 6 Drawing Sheets

DELAY LINE INTERFEROMETER MULTIPLEXER

CROSS-REFERENCE TO RELATED APPLICATIONS

The present application claims the benefit of and priority to U.S. Provisional Application No. 61/482,118 filed May 3, 2011. The foregoing provisional application is herein incorporated by reference in its entirety.

BACKGROUND

1. Field of the Invention

Embodiments disclosed herein generally relate to techniques for multiplexing optical signals. More particularly, some example embodiments relate to an optical multiplexer (MUX) including a cascaded delay line interferometer (DLI).

2. Related Technology

An optical multiplexer (MUX) merges multiple optical signals that are each at a different wavelength into mutual optical alignment as a single multiplexed signal. For example, optical signals produced at different wavelengths by a corresponding number of distinct lasers may be combined by an optical multiplexer into a multiplexed signal that can then be transmitted from a single multiplexed signal transmitting port.

Some MUX designs, such as arrayed waveguide gratings (AWGs) and bulk optics (e.g., Echelle grating, spatial grating MUX), suffer from various limitations. For example, the size of such MUX designs may be relatively large, making them too large to be used in certain applications where space is limited. Such MUX designs may also have a relatively high insertion loss, such as about 3 dB or more. Also, such MUX designs can be relatively expensive.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Embodiments disclosed herein generally relate to a DLI MUX.

In an example embodiment, a delay line interferometer (DLI) multiplexer (MUX) includes a first stage and a second stage. The first stage includes a first DLI and a second DLI. The first DLI includes a first left input, a first right input, and a first output and has a free spectral range (FSR) that is about four times a nominal channel spacing. The second DLI includes a second left input, a second right input, and a second output and has an FSR that is about four times the nominal channel spacing. Transmission peaks of the second DLI may be shifted relative to those of the first DLI by an amount about equal to the nominal channel spacing. The second stage is coupled to the first stage and includes a third DLI. The third DLI includes a third left input optically coupled to the first output of the first DLI, a third right input optically coupled to the second output of the second DLI, and a third output. An FSR of the third DLI is about two times the nominal channel spacing.

In another example embodiment, a DLI MUX includes a first stage and a second stage. The first stage includes a first DLI and a second DLI. The first DLI is configured to receive first and second optical signals having respective first and second wavelengths and is further configured to output a first multiplexed signal including the first and second optical signals. The second DLI is configured to receive third and fourth optical signals having respective third and fourth wavelengths and is further configured to output a second multiplexed signal including the third and fourth optical signals. An FSR of each of the first and second DLIs is about four times a nominal channel spacing of the first, second, third and fourth optical signals. Transmission peaks of the second DLI may be shifted relative to those of the first DLI by an amount about equal to the nominal channel spacing. The second stage is coupled to the first stage and includes a third DLI configured to receive the first and second multiplexed signals and further configured to output a third multiplexed signal including the first, second, third, and fourth optical signals.

In yet another example embodiment, a monolithic chip includes a DLI MUX and multiple optical signal sources. The DLI MUX includes a first and second stage. The first stage includes a first DLI and a second DLI. The first DLI includes a first left input, a first right input, and a first output and has an FSR that is about four times a nominal channel spacing. The second DLI includes a second left input, a second right input, and a second output and has an FSR that is about four times the nominal channel spacing. Transmission peaks of the second DLI may be shifted relative to those of the first DLI by an amount about equal to the nominal channel spacing. The second stage includes a third DLI including a third left input optically coupled to the first output of the first DLI, a third right input optically coupled to the second output of the second DLI, and a third output. An FSR of the third DLI is about two times the nominal channel spacing. The optical signal sources include at least first, second, third and fourth optical signal sources, each configured to emit an optical signal having a respective first, second, third or fourth wavelength into a respective one of the first left input, first right input, second left input or second right input.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Some example embodiments disclosed herein relate to an optical MUX including a cascaded delay line interferometer (DLI). Accordingly, the optical MUX may be referred to herein as a DLI MUX. In general, the DLI MUX may be configured to multiplex $2^n$ optical signals (n>1) into a single multiplexed optical signal. In some embodiments, the $2^n$ optical signals have a nominal channel spacing.

Moreover, the DLI MUX may include multiple stages, where each stage includes one or more DLIs. In some embodiments, each DLI includes a 2×2 multi-mode interference (MMI) device, an MMI combiner, and two optical paths of different lengths coupled between the 2×2 MMI device and the MMI combiner.

The multiple stages included in the DLI MUX may include at least first and second stages, where the second stage is an output stage. The second or output stage may include a DLI having a free spectral range (FSR) of about two times the nominal channel spacing. The first stage may be an input stage or an intermediate stage between the second stage and at least one earlier stage. The first stage may include two DLIs, each having an FSR of about four times the nominal channel spacing. In embodiments including an earlier stage before the first stage, the earlier stage may include four DLIs, each having an FSR of about eight times the nominal channel spacing.

Some of the disclosed embodiments have a relatively low coupling loss of between about 0.5 to 1 dB for each 2×1 MMI combiner or 2×2 MMI device included in the DLI MUX. Alternately or additionally, the DLI MUX may have a relatively small footprint of less than about 300 micrometers (μm) by 100 μm. Alternately or additionally, the DLI MUX may be monolithically integrated with an array of optical signal sources, such as an array of directly modulated lasers (DMLs) or an array of external modulated lasers (EMLs). In some embodiments, wavelengths of the optical signal sources and DLI filter peaks may move together with temperature such that precise control of thermo-electric cooler (TEC) temperature is not necessary for proper operation.

Optionally, embodiments of a DLI MUX can be implemented to multiplex up to 32 optical signals or more, either alone or in combination with a polarization multiplexer or other multiplexer.

In some examples, the filter slope of one or more of the DLIs may be used to enhance an extinction ratio (ER) of frequency modulated (FM) and/or amplitude modulated (AM) optical signals. Alternately or additionally, the filter slope of the one or more DLIs can be used to reduce the ER of FM and/or AM modulated optical signals which may be desirable in, e.g., applications involving semiconductor optical amplifiers (SOAs) for amplitude amplification without inter-channel cross talk.

Figure 1:
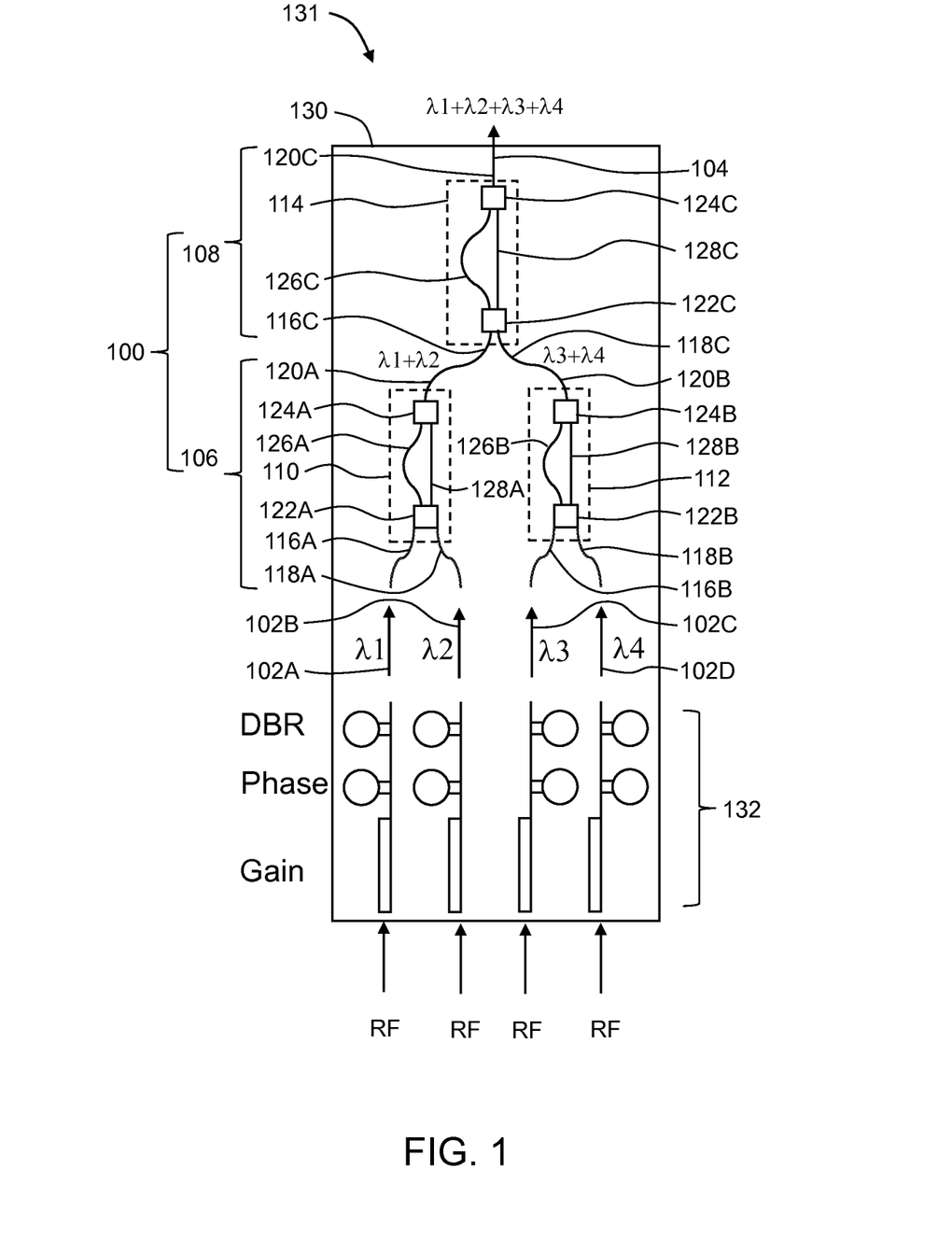
FIG. 1 illustrates an example of a DLI MUX according to some embodiments described herein.

FIG. 1 illustrates an example of a DLI MUX 100, arranged in accordance with at least some embodiments described herein. Various parameters associated with a specific example embodiment of the DLI MUX 100 of FIG. 1 are provided below. It will be understood with the benefit of the present disclosure, however, that the parameters associated with the specific example embodiment are provided by way of illustration only and are not intended to be limiting.

Generally, the DLI MUX 100 may be configured to receive multiple optical signals 102A, 102B, 102C, 102D (collectively "optical signals 102") having different wavelengths λ1, λ2, λ3 and λ4, and to output a single multiplexed signal 104 made up of the optical signals 102. In some embodiments, the optical signals 102 are spaced apart from each other at a nominal channel spacing $\Delta_f$. The nominal channel spacing $\Delta_f$ may be about 400 or about 800 GigaHertz (GHz) in Local Area Network (LAN) Wavelength Division Multiplexing (LWDM) systems, about 20 nm in Course Wavelength Division Multiplexing (CWDM) systems (e.g., systems implementing ITU-T G.694.2), or about 25 or about 50 GHz in Dense Wavelength Division Multiplexing (DWDM) systems, or any other suitable channel spacing. In some embodiments, λ2 is offset from λ1 by $2\Delta_f$, λ3 is offset from λ1 by $\Delta_f$, and λ4 is offset from λ1 by $3\Delta_f$.

As shown, the DLI mux 100 includes a first stage 106 and a second stage 108. The first stage 106 includes a first DLI 110 and a second DLI 112. The second stage 108 includes a third DLI 114. Each of the first, second and third DLI 110, 112, 114 respectively includes a left (L) input 116A, 116B, or 116C, a right (R) input 118A, 118B, or 118C, and an output 120A, 120B, or 120C. Optionally, the L input 116A, the R input 118A and the output 120A of the first DLI 110 may be respectively referred to as the first left input, the first right input, and the first output, while the L input 116B, the R input 118B and the output 120B of the second DLI 112 may be respectively referred to as the second left input, the second right input, and the second output, and the L input 116C, the R input 118C and the output 120C of the third DLI 114 may be respectively referred to as the third left input, the third right input, and the third output, respectively.

Each of the first, second and third DLI 110, 112, 114 has an FSR. The FSR of each of the first and second DLI 110, 112 may be about four times the nominal channel spacing $\Delta_f$, plus or minus 15% of the FSR of the corresponding DLI for a loss of about 0.5 dB in some embodiments. Alternately or additionally, the FSR of the third DLI 114 may be about two times the nominal channel spacing $\Delta_f$, plus or minus 15% of the FSR of the third DLI 114 for a loss of about 0.5 dB in some embodiments.

Each of the first, second and third DLI 110, 112, 114 includes a 2×2 MMI device 122A, 122B, 122C, respectively, and an MMI combiner 124A, 124B, 124C, respectively. Each 2×2 MMI device 122A-122C includes a respective one of the first, second, or third L inputs 116A, 116B, 116C of the first, second, or third DLI 110, 112, 114, a respective one of the first, second or third R inputs 118A, 118B, 118C of the first, second, or third DLI 110, 112, 114, a left output, and a right output. Each MMI combiner 124A-124C includes a left input, a right input, and a respective one of the first, second, or third outputs 120A, 120B, 120C of the first, second, or third DLI 110, 112, 114.

Each of the first, second and third DLI 110, 112, 114 also includes a first optical path 126A, 126B or 126C coupled between the left output of the corresponding 2×2 MMI device 122A, 122B or 122C and the left input of the corresponding MMI combiner 124A, 124B or 124C. Each of the first, second and third DLI 110, 112, 114 further includes a second optical path 128A, 128B or 128C coupled between the right output of the corresponding 2×2 MMI device 122A, 122B or 122C and the right input of the corresponding MMI combiner 124A, 124B or 124C. The second optical path 128A-128C of each of the first, second and third DLI 110, 112, 114 has a different length than the corresponding first optical path 126A-126C.

Various details regarding the operation of the first DLI 110 will now be described with respect to FIG. 2. The operation of the second and third DLI 112, 114 is generally analogous to the operation of the first DLI 110 and will not be described separately.

Figure 2:
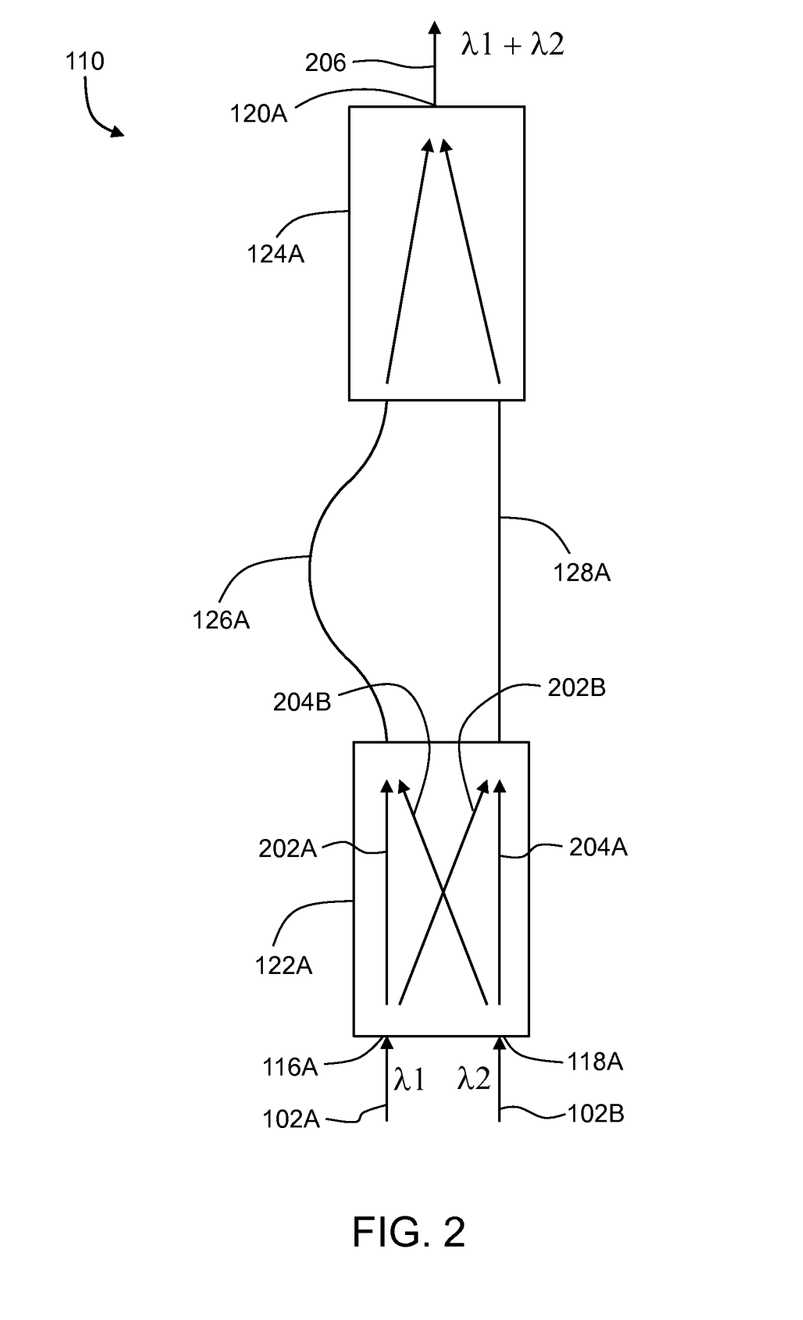
FIG. 2 illustrates an example of a DLI that may be included in the DLI MUX of FIG. 1.

As shown in FIG. 2, the 2×2 MMI device 18A may receive the optical signal 102A at its L input 116A and the optical signal 102B at its R input 118A and may split each into two components having substantially equal power. In particular, a first portion 202A of the optical signal 102A is transmitted directly through the 2×2 MMI device 122A to its left output while a second portion 202B having substantially equal power as the first portion 202A crosses through the 2×2 MMI device 122A to its right output. Similarly, a first portion 204A of the optical signal 102B is transmitted directly through the 2×2 MMI device 122A to its right output while a second portion 204B having substantially equal power as the first portion 102B crosses through the 2×2 MMI device 122A to its left output.

The second portion 202B of the optical signal 102A travels a longer distance than the first portion 202A and thus experiences a phase delay. Similarly, the second portion 204B of the optical signal 102B travels a longer distance than the first portion 204A and therefore also experiences a phase delay.

The first portion 202A of the optical signal 102A and the second portion 204B of the optical signal 102B are received into the first optical path 126A and directed to the left input of the MMI combiner 124A by the first optical path 126A. Similarly, the first portion 204A of the optical signal 102B and the second portion 202B of the optical signal 102A are received into the second optical path 128A and directed to the right input of the MMI combiner 124A by the second optical path 128A. Because the first optical path 126A is longer than the second optical path 128A, the first portion 202A of the optical signal 102A and the second portion 204B of the optical signal 120B experience a phase delay compared to the second portion 202B of the optical signal 102A and the first portion 204A of the optical signal 102B.

In the MMI combiner 124A, interference patterns are created by constructive and destructive interference between the first portion 202A and the second portion 202B of the optical signal 102A, and between the first portion 204A and the second portion 204B of the optical signal 102B. The output of the MMI-combiner 124A is positioned to coincide with a location of constructive interference of the first portion 202A with the second portion 202B, and of the first portion 204A with second portion 204B such that the MMI-combiner 124A outputs a multiplexed optical signal 206 including the optical signal 102A and the optical signal 102B.

Figure 3:
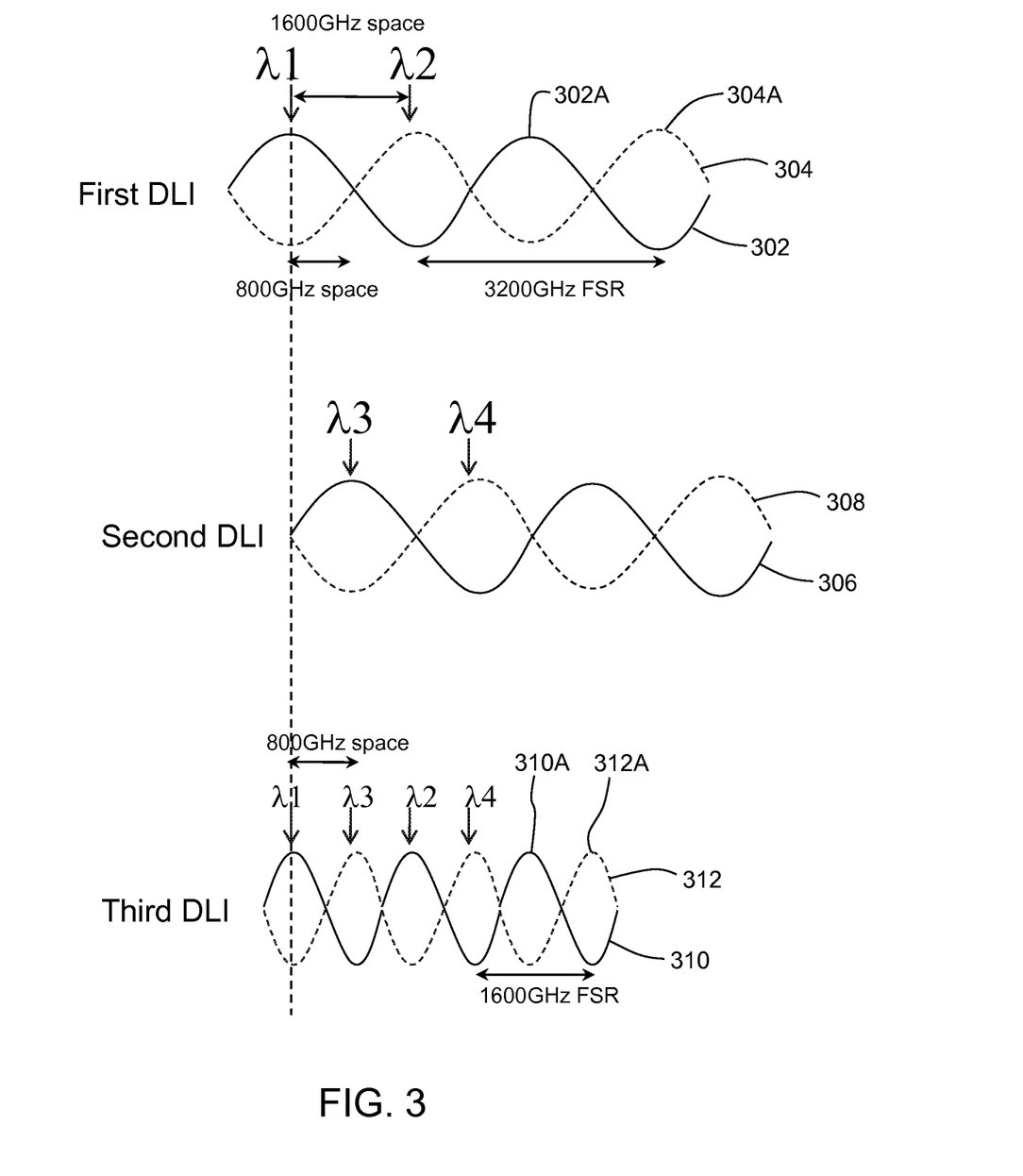
FIG. 3 illustrates various transmission functions that may be associated with the DLI MUX of FIG. 1.

Referring to FIG. 3, the first DLI 110 may be configured to have a first frequency-dependent transmission function 302 resulting from interference between the first and second portions 202A, 202B of the optical signal 102A initially received at the L input 116A of the first DLI 110, and a second frequency-dependent transmission function 304 resulting from interference between the first and second portions 204A, 204B of the optical signal 102B initially received at the R input 118A of the first DLI 110. The first transmission function 302 may also be referred to as the left transmission function since it is applied to the optical signal received at the L input 116A of the first DLI 110, while the second transmission function 304 may also be referred to as the right transmission function since it is applied to the optical signal received at the R input 118A of the first DLI 110.

As shown in FIG. 3, the left and right transmission functions 23, 24 each have periodic transmission peaks 302A, 304A, respectively. The separation between adjacent transmission peaks 302A in the left transmission function 302 is the FSR of the left transmission function 302. Similarly, the separation between adjacent transmission peaks 304A in the right transmission function 304 is the FSR of the right transmission function 304. The FSR may be determined by, among other things, the difference in the path length of the first and second optical paths 126A, 128A, and the properties of the 2×2 MMI device 122A. In some embodiments, for example, the FSR may be calculated according to $$FSR \cong \frac{\lambda^2}{n\Delta L},$$

where λ is a wavelength of the incident light, n is an effective refractive index of the DLI 110, and ΔL is a difference in the path length of the two arms. ΔL becomes smaller for a wider channel spacing. For example, ΔL may be ~25 μm for an FSR of 3200 GHz.

Generally, the first DLI 110 may be configured such that the left and right transmission functions 302, 304 each have the same FSR of about four times the nominal channel spacing. For example, if the nominal channel spacing for wavelengths λ1-λ4 is 800 GHz, the FSR of each of the left and right transmission functions 302, 304 may be about 3200 GHz. Alternately or additionally, the first DLI 110 may be configured such that the right transmission function 304 is offset from the left transmission function 302 by about two times the nominal channel spacing, which may be 1600 GHz for a nominal channel spacing of 800 GHz.

The second DLI 112 has similar left and right transmission functions 306, 308 as the first DLI 110, except that the left and right transmission functions 306, 308 of the second DLI 112 are respectively offset from the left and right transmission functions 302, 304 of the first DLI 110 by about the nominal channel spacing, which may be about 800 GHz in some embodiments. For instance, the left transmission function 306 of the second DLI 112 may be offset from the left transmission function 302 of the first DLI 110 by about the nominal channel spacing, while the right transmission function 308 of the second DLI 112 may also be offset from the right transmission function 304 of the first DLI 110 by about the nominal channel spacing.

The third DLI 114 also has left and right transmission functions 310, 312, each including periodic transmission peaks 310A, 312A. However, the FSR of each of the left and right transmission functions 310, 312 of the third DLI 114 is about two times the nominal channel spacing in some embodiments. Additionally, the right transmission function 312 may be offset from the left transmission function 310 by about the nominal channel spacing, or about 800 GHz in some embodiments.

Accordingly, and with combined reference to FIGS. 1-3, the first DLI 110 may be configured to receive first and second optical signals 102A and 102B having respective first and second wavelengths λ1 and λ2 and to output a first multiplexed signal 206 (FIG. 2) including the first and second optical signals 102A and 102B. Additionally, the second DLI 112 may be configured to receive third and fourth optical signals 102C and 102D having respective third and fourth wavelengths λ3 and λ4 and to output a second multiplexed signal (not shown) including the third and fourth optical signals 102C and 102D. The foregoing multiplexed signals may then be respectively provided to the left input 116C and the R input 118C of the third DLI 114 via optical fibers or other suitable optical waveguides (not labeled). The third DLI 114 may be configured to receive the foregoing multiplexed signals from the outputs 120A, 120B of the first and second DLI 110, 112 and to output the multiplexed signal 104 including the first, second, third and fourth optical signals 102.

Returning to FIG. 1, in some embodiments, the first, second and third DLI 110, 112, 114 may be monolithically integrated together on a substrate 130 as a monolithic chip 131 (hereinafter "chip 131"). Alternately or additionally, the first, second and third DLI 110, 112, 114 may be monolithically integrated on the substrate 130 with one or more optical signal sources 132. Each of the optical signal sources 132 may be configured to emit a corresponding one of the optical signals 102 at the corresponding wavelength $\lambda 1$-$\lambda 4$. In the illustrated embodiment of FIG. 1, the optical signal sources 132 are depicted as Distributed Bragg Reflector (DBR) lasers. More generally, however, each of the optical signal sources 132 may include, but is not limited to, a DML or an EML, which may include one or more of a distributed feedback (DFB) laser, a DBR laser, an electro-absorption (EA) modulator, a Mach-Zehnder (MZ) modulator, or the like or any combination thereof. In the illustrated embodiment, each of the optical signal sources 132 includes a Gain section, a Phase section and a DBR section, although other configurations may be implemented in other embodiments.

The dimensions of a footprint of the DLI MUX 100, e.g., the dimensions of the substrate 130, may be about 650 μm by about 200 μm (or about 300 μm by about 100 μm) in some embodiments in which the FSR of the third DLI 114 is about 400 GHz (or about 1600 GHz) and the nominal channel spacing is about 200 GHz (or about 800 GHz). For larger nominal channel spacing, the dimensions of the DLI MUX 100 may be smaller, while for smaller nominal channel spacing, the dimensions of the DLI MUX 10 may be larger in some embodiments.

Optionally, one or more TECs or other temperature-control elements may be provided to control temperatures of one or more of the first, second and third DLI 110, 112, 114, and/or to control the temperatures of the optical signal sources 132. In some embodiments, a temperature sensitivity of each of the first, second and third DLI 110, 112, 114 may be about 85 picometers per degree Celsius (pm/C), or more or less than 85 pm/C when a semiconductor substrate is implemented as the substrate 130. Alternately or additionally, a temperature sensitivity of the optical signal sources 132 may be about 100 pm/C, or more or less than 100 pm/C. In these and other embodiments, because the temperature sensitivity of each of the first, second and third DLI 110, 112, 114 is relatively close to the temperature sensitivity of the optical signal sources 132, the wavelengths of the optical signal sources 132 and transmission peaks of the first, second and third DLI 110, 112, 114 may generally move together. As such, precise control of TEC temperature may not be required in some embodiments. Alternately or additionally, local temperature increase by a heater in an arm of a given one of the DLIs 110, 112, 114 can alter a loss in the arm of the given one of the DLIs 110, 112, 114. Ideal interference at the output of the given one of the DLIs 110, 112 114, namely a high extinction ratio, can be realized by adjusting the loss of each arm to make it equal to each other.

The slope of the transmission functions 302, 304, 306, 308, 310, 312 of the first, second and/or third DLI 110, 112, 114 can optionally be used to enhance the ER of incoming optical signals 102 that have adiabatic chirp or frequency modulation. For example, each of the optical signals 102 may include a frequency modulated optical signal, or a frequency and amplitude modulated optical signal, in which 1 bits are blue-shifted relative to 0 bits, or vice versa. In other words, the 1 bits of each optical signal 102 may have a first frequency or corresponding wavelength, while the 0 bits of each optical signal 102 may have a second frequency or corresponding wavelength that is red-shifted relative to the first frequency. The frequency offset between the 1 bits and the 0 bits may be between about 20% and 80% of a bit rate of the corresponding optical signal 102, or between about 30% and 70% of the bit rate, or about 50% of the bit rate in some embodiments. Additionally, the corresponding wavelengths (or frequencies) of the corresponding one of the optical signals 102 at the 1 bits and at the 0 bits may be centered about or may otherwise generally be equal to the corresponding wavelength $\lambda 1$, $\lambda 2$, $\lambda 3$ and $\lambda 4$ of the corresponding one of the optical signals 102.

In these and other embodiments, the transmission functions 302, 304, 306, 308, 310, 312 of the first, second and third DLI 110, 112, 114 can be aligned with respect to the wavelengths $\lambda 1$, $\lambda 2$, $\lambda 3$ and $\lambda 4$ of the optical signals 102 so as to enhance the extinction ratio of the optical signals 102. In particular, the transmission functions 302, 304, 306, 308, 310, 312 can be aligned with respect to the wavelengths $\lambda 1$, $\lambda 2$, $\lambda 3$ and $\lambda 4$ of the optical signals 102 so as to attenuate the second frequency (or wavelength) corresponding to 0 bits of each of the optical signals 102 more than the first frequency (or wavelength) corresponding to 1 bits of each of the optical signals 102. Stated another way, positive slope portions of the transmission functions 302, 304, 306, 308, 310, 312 can be aligned to the wavelengths $\lambda 1$, $\lambda 2$, $\lambda 3$ and $\lambda 4$ such that blue-shifted 1 bits in each optical signal 102 are attenuated less than the corresponding red-shifted 0 bits.

Alternately or additionally, the slope can be used to reduce the ER of adiabatically chirped optical signals which may be desirable for amplification without inter-channel cross talk using an SOA. In particular, the transmission functions 302, 304, 306, 308, 310, 312 can be aligned with respect to the wavelengths $\lambda 1$, $\lambda 2$, $\lambda 3$ and $\lambda 4$ of the optical signals 102 so as to attenuate the first frequency (or wavelength) corresponding to 1 bits of each of the optical signals 102 more than the second frequency (or wavelength) corresponding to 0 bits of each of the optical signals 102. Stated another way, negative slope portions of the transmission functions 302, 304, 306, 308, 310, 312 can be aligned to the wavelengths $\lambda 1$, $\lambda 2$, $\lambda 3$ and $\lambda 4$ such that blue-shifted 1 bits in each optical signal 102 are attenuated more than the corresponding red-shifted 0 bits.

Various details regarding the use of DLI slope to alter the ER of optical signals are provided in U.S. patent application Ser. No. 13/370,796, filed Feb. 10, 2012 and entitled OPTICAL FILTER FOR USE IN A LASER TRANSMITTER, which application is herein incorporated by reference in its entirety.

The DLI MUX 100 of FIG. 1 may be modified and used alone or in combination with other components to multiplex up to 32 channels or more into a single multiplexed output signal. For example, one or more DLI MUXs 100 or modified versions thereof may be combined with a polarization multiplexer or other multiplexer to multiplex up to 32 channels or more. Alternately or additionally, a modified version of the DLI MUX 100 may be used to multiplex up to 32 channels or more.

Figure 4:
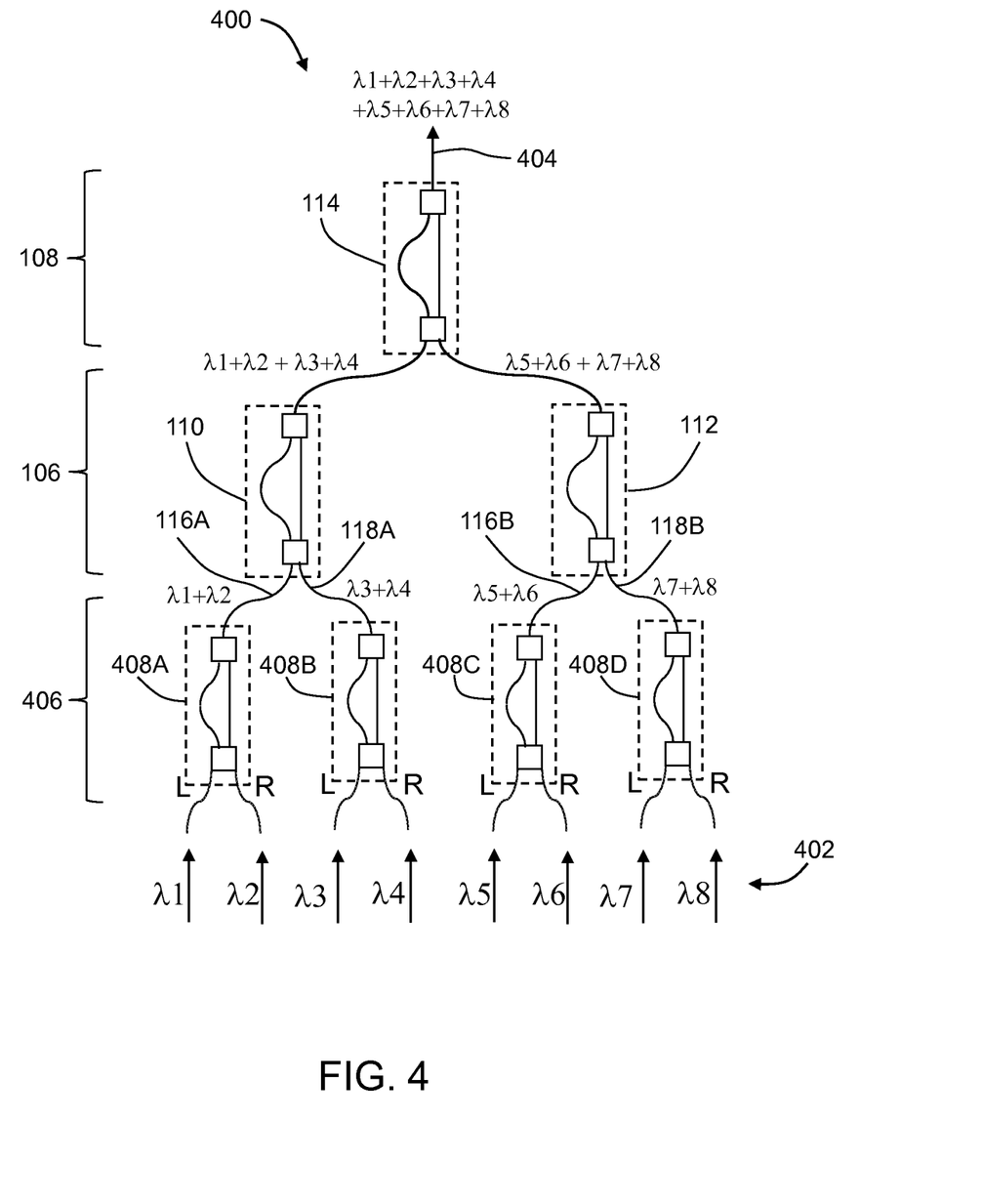
FIG. 4 illustrates another example of a DLI MUX according to some embodiments described herein.

The DLI MUX 100 of FIG. 1 is configured to multiplex four optical signals 102 into a single multiplexed signal 104. FIG. 4 illustrates another embodiment of a DLI MUX 400 that is configured to multiplex eight optical signals 402 into a single multiplexed signal 404 including the eight optical signals 402. The optical signals 402 may have wavelengths $\lambda 1$-$\lambda 8$ spaced at the nominal channel spacing $\Delta_f$. In some examples, $\lambda 2$ is offset from $\lambda 1$ by $4\Delta_f$, $\lambda 3$ is offset from $\lambda 1$ by $2\Delta_f$, $\lambda 4$ is offset from $\lambda 1$ by $6\Delta_f$, $\lambda 5$ is offset from $\lambda 1$ by $\Delta_f$, $\lambda 6$ is offset from $\lambda 1$ by $5\Delta_f$, $\lambda 7$ is offset from $\lambda 1$ by $3\Delta_f$, and $\lambda 8$ is offset from $\lambda 1$ by $7\Delta_f$.

The DLI MUX 400 of FIG. 4 includes the same first and second stage 106 and 108 as the DLI MUX 100 of FIG. 1. The first stage 106 of FIG. 4 is generally configured similar to the first stage 106 of FIG. 1 in which each of the first DLI 110 and the second DLI 112 has an FSR of about four times the nominal channel spacing, where the right transmission function of each is offset from the left transmission function of each by about two times the channel spacing, and the left and right transmission functions of the second DLI 112 are offset from the left and right transmission functions of the first DLI 110 by about the nominal channel spacing. The second stage 108 of FIG. 4 is configured similar to the second stage 108 of FIG. 1 in which the third DLI 114 has an FSR of about two times the nominal channel spacing and the right transmission function of the third DLI 114 is offset from the left transmission function of the third DLI 114 by about the nominal channel spacing.

In addition, the DLI MUX 400 of FIG. 4 includes a third stage 406 coupled to the first stage 106. The third stage 402 includes fourth, fifth, sixth and seventh DLIs 408A-408D (collectively "DLIs 408"). Similar to the first, second and third DLI 110, 112, 114, each of the DLIs 408 includes a left or L input, a right or R input, an output (not labeled), a 2×2 MMI device (not labeled), an MMI combiner (not labeled), and first and second optical paths (not labeled) of different lengths coupled between the corresponding 2×2 MMI device and MMI combiner. Additionally, the output of the fourth DLI 408A is coupled to the left input 116A of the first DLI 110. The output of the fifth DLI 408B is coupled to the right input 118A of the first DLI 110. The output of the sixth DLI 408C is coupled to the left input 116B of the second DLI 112. The output of the seventh DLI 408D is coupled to the right input 118B of the second DLI.

In these and other embodiments, an FSR of each of the fourth, fifth, sixth and seventh DLI 408 may be about eight times the nominal channel spacing, with the right transmission function of each being offset from the respective left transmission function of each by about four times the nominal channel spacing.

Returning to FIG. 1, and as indicated previously, the DLI MUX 100 of FIG. 1 may be integrated on the substrate 130 with four optical signal sources 132 in some embodiments. To avoid radio frequency (RF) cross-talk at RF inputs to the optical signal sources 132, adjacent RF inputs of the optical signal sources 132 may be separated by a minimum pitch. In some embodiments, for example, the minimum pitch may be about 800 µm, in which case the substrate 130 may be at least 2,400 µm wide. However, other configurations may be implemented to reduce the width of a monolithic chip, such as the chip 131, including the substrate 130, optical signal sources 132 and respective RF inputs, and the DLI MUX 100.

Figure 5:
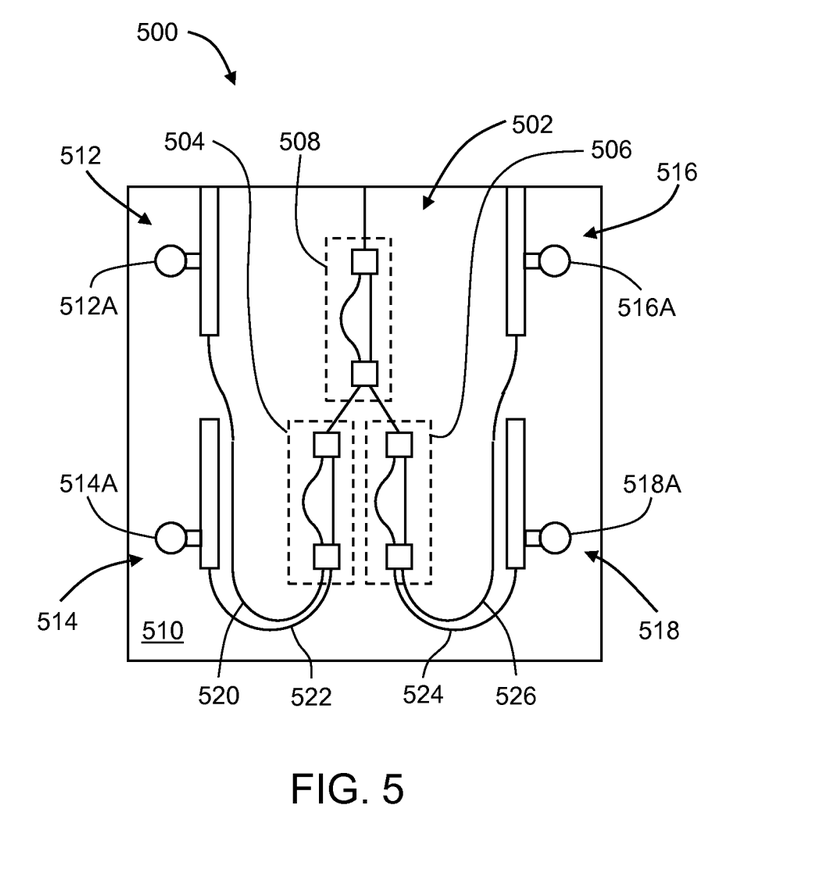
FIG. 5 illustrates a monolithic chip including an embodiment of a DLI MUX.

For example, FIG. 5 illustrates a monolithic chip 500 (hereinafter "chip 500") including another embodiment of a DLI MUX 502 including a first, second, and third DLI 504, 506, 508, each generally configured similar to the respective first, second and third DLI 110, 112, 114 of FIG. 1. For instance, the first and second DLI 504, 506 may make up a first stage of the DLI MUX 502, similar to the first stage 106 of FIG. 1, while the third DLI 508 may make up a second stage of the DLI MUX 502, similar to the second stage 108 of FIG. 1.

The chip 500 may additionally include a substrate 510 and four optical signal sources 512, 514, 516, 518 formed thereon. The optical signal sources 512, 514, 516, 518 may generally be spaced equally around a perimeter of the substrate 510, such as generally in each of the four corners of the substrate 510.

The chip 500 may further include multiple waveguides 520, 522, 524, 526 coupled between the optical signal sources 512, 514, 516, 518 and corresponding inputs of the first and second DLI 504, 506, each of the waveguides 520, 522, 524, 526 providing a 180 degree turn. In more detail, the waveguide 520 is coupled between the optical signal source 512 and the left input of the first DLI 504. The waveguide 522 is coupled between the optical signal source 514 and the right input of the first DLI 504. The waveguide 524 is coupled between the optical signal source 518 and the left input of the second DLI 506. The waveguide 526 is coupled between the optical signal source 516 and the right input of the second DLI 506.

Using the configuration of FIG. 5, RF inputs 512A, 514A, 516A, 518A of the optical signal sources 512, 514, 516, 518 may be separated by a corresponding minimum pitch while the overall dimensions of the chip 500 may be relatively compact. For example, for a minimum pitch of 800 µm, the overall dimensions of the chip 500 may be about 800 µm by 800 µm, or a little more than 800 µm by 800 µm to accommodate bonding pads or the like. In contrast, configurations in which optical signal sources are aligned in parallel, such as the configuration of FIG. 1, may have a width of at least about 2400 µm for four optical signal sources as already discussed above.

Figure 6:
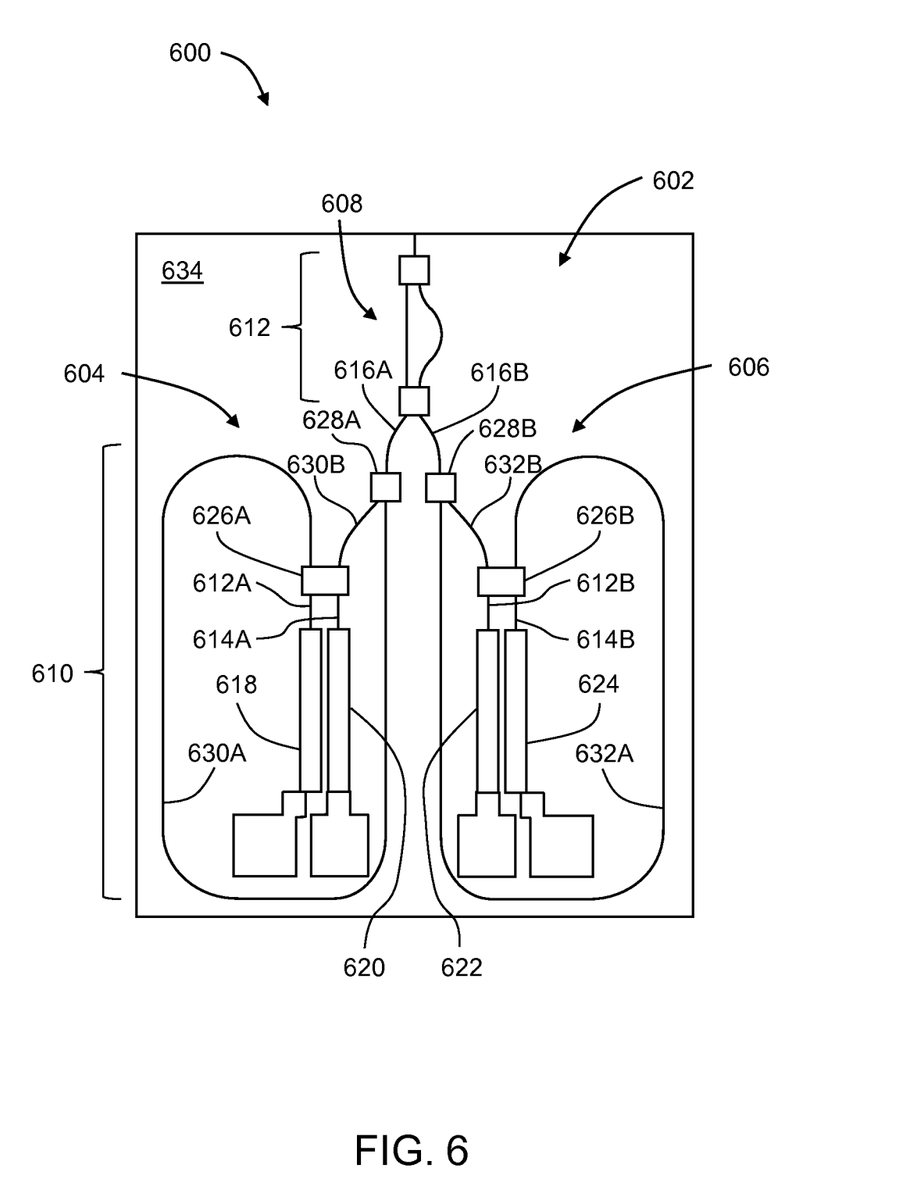
FIG. 6 illustrates a monolithic chip including another embodiment of a DLI MUX.

FIG. 6 illustrates a monolithic chip 600 (hereinafter "chip 600") including another embodiment of a DLI MUX 602 including a first, second, and third DLI 604, 606, 608, the first and second DLI 604 making up a first stage 610 of the DLI MUX 602 and the third DLI 608 making up a second stage 612 of the DLI MUX 602.

The second stage 612 and the third DLI 608 of FIG. 6 may generally correspond in form and function to the second stage 108 and the third DLI 114 of FIG. 1. As such, an additional description of the second stage 612 and the third DLI 608 will not be provided herein and reference may be made to the discussion of the second stage 108 and the third DLI 114 of FIG. 1.

The first stage 610 and the first and second DLI 604, 606 may generally correspond to the first stage 106 and the first and second DLI 110, 112 of FIG. 1, with some differences as explained below. Each of the first and second DLI 604, 606 may respectively include a left (L) input 612A or 612B, a right (R) input 614A or 614B, and an output 616A or 616B, similar to the first and second DLI 110, 112 of FIG. 1.

Each of the L input 612A of the first DLI 604, the R input 614A of the first DLI 604, the L input 612B of the second DLI 606 and the R input 614B of the second DLI 606 may be respectively coupled to a corresponding optical signal source 618, 620, 622, 624 configured to emit optical signals having respective wavelengths λ1, λ2, λ3 and λ4. The optical signal sources 618, 620, 622, 624 may be provided on the same chip 600 as the DLI MUX 602 as illustrated, or external to the chip 600. The wavelengths λ1, λ2, λ3 and λ4 of the optical signals emitted by the optical signal sources 618, 620, 622, 624 may be spaced apart from each other at the nominal spacing $\Delta_f$. In some embodiments, λ2 is offset from λ1 by $2\Delta_f$, λ3 is offset from λ1 by $\Delta_f$, and λ4 is offset from λ1 by $3\Delta_f$, as described above.

Each of the first and second DLI 604, 606 may additionally include a 2×2 MMI device 626A, 626B, respectively, and an MMI combiner 628A, 628B, respectively. Two optical paths 630A, 630B of different lengths are provided between the 2×2 MMI device 626A and the MMI combiner 628A. Similarly, two optical paths 632A, 632B of different lengths are provided between the 2×2 MMI device 626B and the MMI combiner 628B.

Aspects of the first DLI 604 will now be explained which may be similarly applicable to the second DLI 606. The long optical path 630A in the first DLI 604 has four 90 degree turns in the illustrated embodiment. A radius of each of the 90 degree turns may be about 150 µm, or more or less than 150 µm. In some embodiments, a length of the long optical path 630A may be about 2.5 millimeters (mm) longer than a length of the short optical path 630B to achieve an FSR of about 30 GHz for the first DLI 604. An FSR of about 30 GHz may be suitable for optical signals having data rates of about 10 gigabits per second (G), for example.

Loss in the long optical path 630A may be higher than the loss in the short optical path 630B, such as about 1.5 decibels (dB) higher in some embodiments. To compensate for the relatively higher loss in the long optical path 630A as compared to the loss in the short optical paths 630B, the 2×2 MMI device 626A may be configured to split each of the optical signals received on the L and R inputs 612A, 614A unequally. For instance, the 2×2 MMI device 626A may apply a 60:40 splitting ratio, or some other unequal splitting ratio. Accordingly, the optical signal received on the L input 612A may be split such that about 60 percent is transmitted onto the long optical path 630A and 40 percent is transmitted onto the short optical path 630B. Similarly, the optical signal received on the R input 614A may be split such that about 60 percent is transmitted onto the long optical path 630A and 40 percent is transmitted onto the short optical path 630B. An estimated total loss of the first DLI 604 may be reduced by applying a 60:40 splitting ratio (or some other unequal splitting ratio) by about 1.7 dB rather than applying an equal 50:50 splitting ratio at the 2×2 MMI device 626A. In these and other embodiments, the 2×2 MMI device 626A and/or the 2×2 MMI device 626B may include a butterfly MMI device or other suitable 2×2 MMI device configured to split two incoming optical signals unequally.

Alternately or additionally, the optical signal sources 618 and 620 and the optical signal sources 622 and 624 may be monolithically formed in the chip 600, e.g., on a substrate 634, within a loop formed by a respective one of the long optical path 630A or 632A to simultaneously minimize bending loss and the size of the chip 600. In an example embodiment, the chip 600 may be about 800 µm by about 700 µm when each of the first and second DLI 604, 606 has an FSR of about 30 GHz for 10 G applications. Alternately or additionally, the chip 600 may be smaller than about 800 µm by about 700 µm when each of the first and second DL 604, 606 has an FSR of about 100 GHz for 25 G applications, or larger than about 800 µm by about 700 µm.

The chip 600 may be used in any of a variety of applications. For example, the chip 600 may be used in 80 kilometer (km) uncooled 10 G applications, 40-60 km high-power 10 G passive optical network (PON) applications, or the like. Alternately or additionally, the chip 600 may be used in 40 km 1310 nm 25 G applications as a replacement for four externally modulated lasers (EMLs) with relatively low power output, while allowing elimination of a semiconductor optical amplifier (SOA) typically used in front of a positive-intrinsic-negative (PIN) photodiode on the receive side in such applications. The foregoing are only some example applications in which the chip 600 and other embodiments described herein may be implemented.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A delay line interferometer (DLI) multiplexer (MUX), comprising:
   a first stage comprising:
      a first DLI including a first left input, a first right input, and a first output and having a free spectral range (FSR) that is about four times a nominal channel spacing; and
      a second DLI including a second left input, a second right input, and a second output and having an FSR that is about four times the nominal channel spacing, wherein transmission peaks of the second DLI are shifted relative to transmission peaks of the first DLI by an amount about equal to the nominal channel spacing; and a second stage coupled to the first stage and comprising a third DLI including:
      a third left input optically coupled to the first output of the first DLI;
      a third right input optically coupled to the second output of the second DLI; and
      a third output;
      wherein an FSR of the third DLI is about two times the nominal channel spacing.

2. The DLI MUX of claim 1, wherein each of the first, second and third DLIs comprises:
   a 2×2 multi-mode interference (MMI) device including: a respective one of the first, second or third left input, a respective one of the first, second or third right input, a left output, and a right output;
   an MMI combiner including: a left input, a right input, and a respective one of the first, second or third output;
   a first optical path coupled between the left output of the 2×2 MMI device and the left input of the MMI combiner; and
   a second optical path having a different length than the first optical path, wherein the second optical path is coupled between the right output of the 2×2 MMI device and the right input of the MMI combiner.

3. The DLI MUX of claim 1, wherein each of the first, second and third DLIs is configured to apply:
   a left transmission function to a corresponding optical signal received at a respective one of the first, second or third left inputs; and
   a right transmission function to a corresponding optical signal received at a respective one of the first, second or third right inputs.

4. The DLI MUX of claim 3, wherein:
   the right transmission function of each of the first and second DLIs is offset from the left transmission function of each of the first and second DLIs by about two times the nominal channel spacing;
   the right transmission function of the third DLI is offset from the left transmission function of the third DLI by about the nominal channel spacing.

5. The DLI MUX of claim 4, wherein:
   the first DLI is configured to receive at the first left input a first optical signal having a first wavelength;
   the left transmission function of the first DLI has a transmission peak aligned to the first wavelength;
   the first DLI is configured to receive at the first right input a second optical signal having a second wavelength;
   the right transmission function of the first DLI has a transmission peak aligned to the second wavelength; the second DLI is configured to receive at the second left input a third optical signal having a third wavelength;

the left transmission function of the second DLI has a transmission peak aligned to the third wavelength;

the second DLI is configured to receive at the second right input a fourth optical signal having a fourth wavelength;

the right transmission function of the second DLI has a transmission peak aligned to the fourth wavelength;

the third DLI is configured to receive at the third left input a first multiplexed optical signal including the first and second optical signals;

the left transmission function of the third DLI has one transmission peak aligned to the first wavelength and another transmission peak aligned to the second wavelength;

the third DLI is configured to receive at the third right input a second multiplexed optical signal including the third and fourth optical signals;

the right transmission function of the third DLI has one transmission peak aligned to the third wavelength and another transmission peak aligned to the fourth wavelength; and the third DLI is configured to output at the third output a third multiplexed signal including the first, second, third, and fourth optical signals.

6. The DLI MUX of claim 1, wherein the DLI MUX is configured to receive four optical signals having wavelengths spaced at about the nominal channel spacing at, respectively, the first left input, the first right input, the second left input and the second right input and to output a single multiplexed optical signal including the four optical signals at the third output.

7. The DLI MUX of claim 1, further comprising:
a third stage coupled to the first stage and comprising fourth, fifth, sixth and seventh DLIs;
wherein:
each of the fourth, fifth, sixth and seventh DLI includes a left input, a right input, and an output;
an output of the fourth DLI is coupled to the first left input of the first DLI;
an output of the fifth DLI is coupled to the first right input of the first DLI;
an output of the sixth DLI is coupled to the second left input of the second DLI;
an output of the seventh DLI is coupled to the second right input of the second DLI; and
an FSR of each of the fourth, fifth, sixth and seventh DLI is about eight times the nominal channel spacing.

8. The DLI MUX of claim 7, wherein the DLI MUX is configured to receive eight optical signals having wavelengths spaced at about the nominal channel spacing at, respectively, the left and right inputs of the fourth, fifth, sixth and seventh DLIs and to output a single multiplexed optical signal including the eight optical signals at the third output of the third DLI.

9. A delay line interferometer (DLI) multiplexer (MUX), comprising:
a first stage comprising:
a first DLI configured to receive first and second optical signals having respective first and second wavelengths and further configured to output a first multiplexed signal including the first and second optical signals; and
a second DLI configured to receive third and fourth optical signals having respective third and fourth wavelengths and further configured to output a second multiplexed signal including the third and fourth optical signals;

wherein a free spectral range (FSR) of each of the first and second DLIs is about four times a nominal channel spacing of the first, second, third and fourth optical signals and wherein transmission peaks of the second DLI are shifted relative to transmission peaks of the first DLI by an amount about equal to the nominal channel spacing; and a second stage coupled to the first stage and comprising a third DLI configured to receive the first and second multiplexed signals and further configured to output a third multiplexed signal including the first, second, third, and fourth optical signals.

10. The DLI MUX of claim 9, wherein the first DLI, second DLI and third DLI are monolithically integrated on a substrate having a footprint of less than 300 micrometers by 100 micrometers.

11. The DLI MUX of claim 9, wherein:
the first DLI comprises:
a first 2×2 multi-mode interference (MMI) device including a first left input, a first right input, a left output and a right output;
a first MMI combiner including a left input, a right input, and a first output;
a first optical path coupled between the left output of the first 2×2 MMI device and the left input of the first MMI combiner; and
a second optical path having a different length than the first optical path, wherein the second optical path is coupled between the right output of the first 2×2 MMI device and the right input of the first MMI combiner;
the second DLI comprises:
a second 2×2 MMI device including a second left input, a second right input, a left output and a right output;
a second MMI combiner including a left input, a right input, and a second output;
a third optical path coupled between the left output of the second 2×2 MMI device and the left input of the second MMI combiner; and
a fourth optical path having a different length than the third optical path, wherein the fourth optical path is coupled between the right output of the second 2×2 MMI device and the right input of the second MMI combiner; and
the third DLI comprises:
a third 2×2 MMI device including a third left input, a third right input, a left output and a right output;
a third MMI combiner including a left input, a right input, and a third output;
a fifth optical path coupled between the left output of the third 2×2 MMI device and the left input of the third MMI combiner; and
a sixth optical path having a different length than the fifth optical path, wherein the fifth optical path is coupled between the right output of the third 2×2 MMI device and the right input of the third MMI combiner.

12. The DLI MUX of claim 11, wherein:
the first 2×2 MMI device is configured to apply an unequal splitting ratio to each of the first and second optical signals; and
the second 2×2 MMI device is configured to apply an unequal splitting ratio to each of the third and fourth optical signals.

13. The DLI MUX of claim 12, wherein each of the first and second 2×2 MMI devices comprises a butterfly MMI device.

14. A monolithic chip, comprising:
a delay line interferometer (DLI) multiplexer (MUX), comprising:
  a first stage comprising:
    a first DLI including a first left input, a first right input, and a first output and having a free spectral range (FSR) that is about four times a nominal channel spacing; and
    a second DLI including a second left input, a second right input, and a second output and having an FSR that is about four times the nominal channel spacing, wherein transmission peaks of the second DLI are shifted relative to transmission peaks of the first DLI by an amount about equal to the nominal channel spacing; and
  a second stage comprising a third DLI including:
    a third left input optically coupled to the first output of the first DLI;
    a third right input optically coupled to the second output of the second DLI; and
    a third output;
    wherein an FSR of the third DLI is about two times the nominal channel spacing; and
  a plurality of optical signal sources including at least first, second, third and fourth optical signal sources each configured to emit an optical signal having a respective first, second, third or fourth wavelength into a respective one of the first left input, first right input, second left input or second right input.

15. The monolithic chip of claim 14, further comprising a substrate having substantially rectangular shape, wherein each of the plurality of optical signal sources is located near a respective corner of the substrate and wherein a footprint of the substrate is about 800 micrometers by about 800 micrometers.

16. The monolithic chip of claim 14, wherein:
  the first DLI includes a first 2×2 multi-mode interference (MMI) device, a first MMI combiner, and a long optical path and a short optical path coupled between the first 2×2 MMI device and the first MMI combiner;
  the second DLI includes a second 2×2 MMI device, a second MMI combiner, and a long optical path and a short optical path coupled between the second 2×2 MMI device and the second MMI combiner; and
  the long optical path of each of the first and second DLI is about 2.5 millimeters longer than the short optical path of the respective first or second DLI.

17. The monolithic chip of claim 16, wherein each of the first and second optical signal sources is formed in the monolithic chip within a loop formed by the long path of the first DLI and each of the third and fourth optical signal sources is formed in the monolithic chip within a loop formed by the long path of the second DLI.

18. The monolithic chip of claim 14, wherein transmission functions of the first, second and third DLI are aligned with respect to the first, second, third and/or fourth wavelengths so as to enhance an extinction ratio of each of the optical signals emitted by the first, second, third and fourth optical signal sources, each of the optical signals being a frequency modulated optical signal.

19. The monolithic chip of claim 18, wherein for each of the optical signals, 1 bits have a first frequency and 0 bits have a second frequency and at least one of the transmission functions is aligned to attenuate the second frequency more than the first frequency.

20. The monolithic chip of claim 14, wherein transmission functions of the first, second and third DLI are aligned with respect to the first, second, third and/or fourth wavelengths so as to reduce an extinction ratio of each of the optical signals emitted by the first, second, third and fourth optical signal sources, each of the optical signals being a frequency modulated optical signal.

21. The monolithic chip of claim 20, wherein for each of the optical signals, 1 bits have a first frequency and 0 bits have a second frequency and at least one of the transmission functions is aligned to attenuate the first frequency more than the second frequency.

* * * * *